Figure 1:
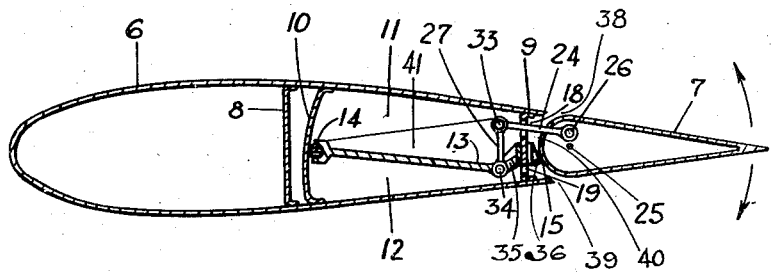

Oct. 24, 1944.  R. P. DAVIE, JR  2,361,275
AERODYNAMIC CONTROL ARRANGEMENT
Filed Feb. 24, 1942

Robert P. Davie, Jr.
INVENTOR.

BY *James M. Clark*
HIS PATENT ATTORNEY

Patented Oct. 24, 1944

2,361,275

UNITED STATES PATENT OFFICE 2,361,275

AERODYNAMIC CONTROL ARRANGEMENT

Robert P. Davie, Jr., Manhattan Beach, Calif., assignor to North American Aviation, Inc., Inglewood, Calif., a corporation of Delaware Application February 24, 1942, Serial No. 432,099

8 Claims. (Cl. 244—90)

This invention relates to means for balancing the hinge torques existing in connection with aircraft control surfaces and is concerned with improvements in the aerodynamic type of balance which also are effective to provide a certain degree of dynamic as well as static balance about the control surface hinge axis.

As is well known at the present time, any deflection of a control surface away from its neutral position into a fluid stream is immediately resisted by the pressure of the fluid stream impinging on the projected area of the control surface. Such a pressure produces a torque about the hinge axis of the control surface which is in opposition to the original force causing the displacement of the surface. In aircraft of high speed or large size this oppositional force reaches such proportion as to make it impossible for a pilot to actuate the control surfaces and because of this condition various types of aerodynamic balancing have been proposed.

The desirability of disposing any balancing apparatus within the skin surfaces of an airfoil or aircraft may well be understood as well as the necessity of constructing the balancing apparatus as a separate structure from the control surface itself although it may be contained within the airfoil confines. With the balancing apparatus structurally a separate unit, any distortions occurring in the control surface will not affect the operation of the balancing apparatus.

Thus it is a principal object of this invention to provide a practical aerodynamic control arrangement adapted to automatically provide a degree of compensating torque acting to balance the torque set up whenever an associated control surface is deflected from its neutral position.

Another object is to so embody such a balance arrangement that it will not set up or cause any additional drag on an aircraft in which it is employed; and still another object is the provision of balancing apparatus which is not integrally connected to or a part of the structure of the control surface with which it is associated. This latter provision is important from the standpoint of providing trouble-free operation under severe service conditions and also to simplify the construction and maintenance of the control surface which need not be encumbered by an apparatus having relatively moving parts as well as pressure sealing problems.

Other objects are to provide sealing arrangements in the balance apparatus effective to prevent dissipation through leakage of the differential pressure depended upon to cause operation of the device and also to provide a certain degree of static and dynamic balancing through the single apparatus employed for the aerodynamic balancing.

With the above and other objects in view, this invention consists in the construction, combination and arrangement of parts as will be hereinafter more fully described, illustrated in the accompanying drawing and more particularly defined as within the scope of the appended claims.

Figure 2:
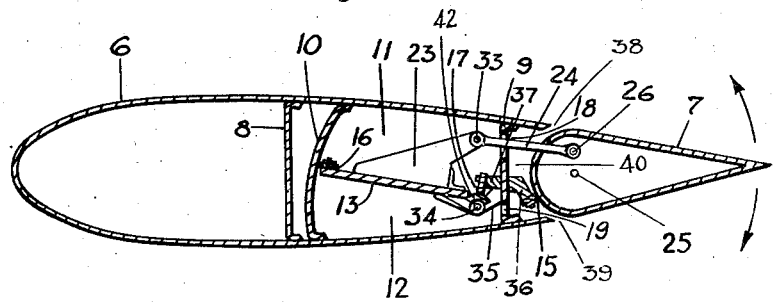
Figure 3:
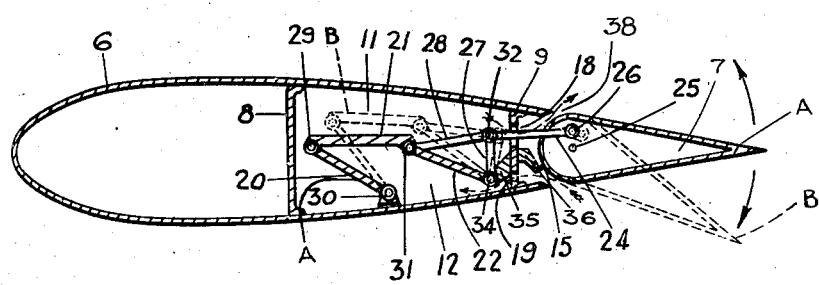

In the drawing:

Figs. 1, 2 and 3 are sectional views of airfoils each embodying different modifications of the present invention.

In each of the figures of the drawing, the numeral 6 indicates a suitable airfoil for illustrating the application of the present invention. This airfoil incorporates a movable control surface 7 which is carried thereby in a conventional manner so as to be angularly movable about a hinge axis 25. In other words, the complete airfoil 6 is composed of a fixed forward part and a trailing rearward part 7 relatively movable with respect thereto. Thus the member 7 normally completes the contour of the airfoil and serves as the trailing portion thereof. The airfoil 7 may be constructed with the usual spar structure which may take the form of a main spar 8 and a rear spar 9, the latter being disposed just ahead of the arcuate leading edge of the control surface 7. In each modification the external skin of the airfoil 6 is continued beyond the spar 9 to provide overhanging portions or shields for the nose of the control surface and these shields terminate a sufficient distance therefrom to provide upper and lower slots 38 and 39 respectively.

Referring more particularly to Fig. 1, there is provided a pressure chamber within the airfoil 6 bounded by the upper and lower skin surfaces thereof, the rear spar 9 and an arcuate forward wall 10. This chamber 11—12 is preferably located as close to the nose of the control surface 7 as is possible although it might desirably be located elsewhere. In either case the chamber is preferably put into communication with the atmospheric space in the immediate vicinity of the exteriors of the slots 38 and 39 for reasons to be later set forth. In the present instance this is accomplished by providing a pair of apertures 18 and 19 through the rear spar 9 into the space 40 between this spar and the nose of the control surface 7. This space 40 is in communication with the external atmosphere through the slots 38 and 39.

In order to prevent equalization of any pressure differences existing in the region of the slots 38 and 39 by a relieving flow of air in one direction or the other through the space 40, a fixed partition 36 is placed thereacross which is supported in cantilever fashion from the rear side of the spar 9 and which at its opposite edge is fitted with a sealing strip 15 of rubber or other flexible material in wiping contact with the arcuate nose of the control surface 7. With this arrangement any such pressure differences are kept from intermingling and are made effective for utilization within the pressure chamber.

In order to translate these differential pressure effects into useful work, the present invention provides a pressure responsive member within the chamber 11—12. This member may take either the form of a flexible diaphragm, a movable piston or a bellows device. As shown in Fig. 1 it may preferably take the form of an angularly movable vane or piston member 13 arranged to divide the interior of the pressure chamber into two separate sub chambers, the upper space 11 and lower space 12. These chambers are respectively in communication with the slots 38 and 39 through the apertures 18 and 19 as previously indicated. Furthermore, there is a bracket 35 mounted on the forward wall of the spar 9. This bracket extends the full spanwise width of the pressure chamber and serves to carry one element of a piano type hinge 34 along its free edge. The other element of the hinge 34 is formed of the rear edge of the piston member 13 and in this manner the piston is mounted for angular swinging within the chamber.

The radius of curvature of the forward wall 10 of the chamber is measured from the pivot axis of the hinge 34 so that there is always a constant clearance between the wall and the forward edge of the piston 13. To seal this working clearance, a solid rubber gasket 14, of the type shown, may be employed. There is also a lever 27 extending upward from a rigid connection with the vane 13 and this lever may be part of an integral rib 41 extending out of the surface of the piston vane 13. There is also a pivot connection 33 at the upper end of the lever serving for the connection of a rigid link 24 which extends through the aperture 18 and which at its other end 26 is pivotally connected to the control surface 7 at a point displaced from its pivot axis 25. This interlinkage of the piston with the control surface causes any movement of the piston to be duplicated by the control surface or in other words, any differential existing between the pressures in the compartments 11 and 12 and effective to move the piston in one direction or the other will also be effective to move the control surface correspondingly in the same direction.

The pressure regions about the airfoil, which may be of different magnitudes and which exist in space adjacent the slots 38 and 39, are utilized according to the present invention to cause movement of the piston 13. It is well known that pressure differences exist over the surfaces of an airfoil and also that when a control surface is deflected from its neutral position, the relative airflow over its surfaces is altered considerably. As a result, an increase of pressure is developed locally in the region of the acute angle formed between the fixed airfoil and the control surface and this pressure is measurably greater than the pressure found in the corresponding location on the opposite side of the airfoil. The flow incident to these pressure differentials is indicated by the dotted arrows in Fig. 3. Thus these differential pressures are caused to exist in the region of the slots 38 and 39 and through the instrumentalities of the present invention, these pressure differences are utilized to effect the air pressure balancing of the control surface as described.

In the arrangement shown in Fig. 2, the basic construction and operation is the same as in the arrangement of Fig. 1 except that a different form of sealing against pressure leakage is provided for the movable piston vane 13. Instead of employing a round sealing strip as at 14 in Fig. 1, a flat strip 16 is shown which is bolted to the forward edge of the vane 13. By employing a flat strip of this type, wear thereof over a period of time can be compensated for by moving the sealing strip forward into sealing contact with the wall 10. But more important than this is the sealing means provided for the rear piano hinge 34. Instead of forming the hinge element 42 integral with the vane 13 it is formed separately with provision for attachment of the vane thereto. This forward element 42 is distinguished by an arcuate cover plate designed to shield the hinge element. This cover plate is curved on the axis of the hinge 34 as a radius and in conjunction with a sealing strip 17, pressed into engagement therewith, serves to prevent the leakage of air through the interstices of the piano hinge joint 34. A solid supporting bracket 37 extending spanwise along the rear spar 9 serves to support the sealing strip 17 in position to bear upon the cover plate 42. With this construction, the operation of the balance is exactly the same as described in connection with the first form, the operative connection between the movable vane 13 and the control surface 7 being in the form of a bracket 23 which is pivotally connected at 33 to an operating link 24. By adopting the sealing arrangement just described, a much more efficient sealing may be had as compared to that provided by an unsealed piano hinge joint, even though the less perfectly sealed joint can provide an operable balance for the control surface.

The construction shown in Fig. 3 provides an alternative arrangement for the movable piston. This is characterized by a collapsible bellows arrangement formed of rigid links 20, 21 and 22 pivotally interconnected by piano hinge joints 29 and 31. These rigid members are mounted within the pressure chamber 11—12 so that the member 21 principally serves as the movable piston vane while the members 20 and 22 provide a parallel linkage for supporting the vane 21 in position. These members 20 and 22 are pivotally supported from the wing structure by strip members forming complementary halves to the piano hinge elements formed on the otherwise free extremities of the members 20 and 22. The piano hinges formed by these elements are designated 30 and 34.

Since the hinge 30 is attached to the inner, lower surface of the pressure chamber and the hinge 34 is carried by a solid bracket 35 projecting from the spar 9, the members 20, 21 and 22 enclose a space 12 forming a subdivision of the pressure chamber while the remainder of the space not enclosed by these members is designated 11 and corresponds directly to this space in the prior figures. Both of these subchambers communicate with the exterior of the airfoil through their respective openings 18 and 19.

The operation of this version is exactly parallel to the others although in this case the connection between the piston vane and the operating link 24 is made by means of a triangular interconnection of members 27 and 28, each at one end respectively connected to the hinges 34 and 31. Each of these two links have their opposite ends interconnected by a pivot 32, to which also is connected the forward end of the link 24.

Thus when the control surface 7 is moved from the neutral position A to the dotted line position B, the piston vane assembly 20, 21 and 22 is caused to be moved upwardly from the full line position A to the dotted line position B. At the same time the resulting redistribution of volumes between the subchambers 11 and 12 causes an outflow and inflow of air as shown by the dotted arrows. At the same time the difference of pressure in the regions 38 and 39 created by the pivoting of the control surface becomes effective to also act in the direction of the arrows to assist in moving the control surface. With the arrangement shown in Fig. 3 it is possible to dispense with the curved forward chamber wall 10.

It is to be noted that the combination comprising the airfoil 6 and control surface 7 are applicable to either aeronautic or marine craft. As used on aircraft, the airfoil 6 may be either a wing or main sustaining surface, or a vertical or horizontal fin or stabilizer and the movable surface 7 may be a rudder, elevator or other control surface. It is fully appreciated that numerous attempts have been made to apply the pressure differences on each side of a movable surface to operate certain mechanical means which are in turn connected to the surface to assist in its projection into the airstream. The present invention improves materially over such prior attempts in that its improved arrangement provides a substantially enclosed compartment in the rear portion of the fixed airfoil in which the movable piston vane and the hinged parts are well protected from dust, dirt and ice formation and the vanes and their pivots are rigidly and accurately supported from a trailing partition member which assures maintenance of the pressure differentials and sufficiently large piston areas upon which these pressures may operate.

The vanes 13 in Figs. 1 and 2 may be likened to a rotary piston and the chamber in the rear compartment to a portion of a cylinder. The spanwise ends of the vanes, both 13 in Figs. 1 and 2, and the vane or bellows assembly in Fig. 3 are suitably sealed at their ends where they abut against suitable chordwise bulkheads at each end of the compartments. Other modifications of the present invention contemplate the provision of complete cylinders within which the piston may reciprocate axially and the pressure fluids conducted to the cylinder ends by suitable conduits of indeterminate length.

Other forms and modifications of the present device both with respect to general arrangement and details are intended to come within the scope of the present invention as more clearly defined in the appended claims. Having described the invention in its preferred modifications which are certain specific forms thereof, the details of which admit of many variations, what I claim is:

1. In combination with a fixed airfoil, a movable control surface hinged thereto, aerodynamic balance for said control surface comprising a pressure responsive member, a pressure chamber divided into separate compartments by said member, sealing means adapted to prevent fluid leakage between the two compartments, further sealing means rigidly attached to said airfoil in sliding engagement with said movable control surface, fluid conduits connecting the respective compartments to the atmospheric space adjacent opposite sides of the control surface and a force transmitting linkage interconnecting said pressure responsive member and pivotally connected to the control surface.

2. In an airfoil comprising a main part and a relatively movable control surface attached thereto, the combination of pressure sealing means rigidly supported from the said main part in sliding engagement with the nose of said control surface, pressure chambers contained within the said airfoil, means adapted to respond to the resultant of the fluid pressures existing in the said chambers, a force transmitting connection operatively linking said means to a pivotal connection with the said control surface, and fluid passageways connecting the respective interiors of the said chambers to the atmospheric space adjacent the nose of the said control surface at opposite sides of the said pressure sealing means.

3. An airfoil comprised by a fixed part and a relatively movable part forming a trailing portion of said airfoil and pivotally mounted thereon, said fixed part having a space therewithin opening through the trailing portion of the fixed part, said movable part disposed adjacent and substantially closing the trailing portion of said space, the opposite sides of the movable part being spaced from the adjacent portions of the fixed part to form slots placing the said space at opposite sides in communication with the exterior of the airfoil at opposite sides thereof, sealing means rigidly supported from said fixed part in sliding engagement with the leading edge portion of said movable part to partition said space intermediate said slots, pressure chambers contained within the said airfoil, means adapted to respond to the resultant of the fluid pressures existing in the said chambers, fluid passageways connecting the interiors of the said chambers respectively to the said space at opposite sides of the said sealing means, and a force transmitting connection pivotally attached to both said means and to the said movable part.

4. In an airfoil comprising a main part and a relatively movable control surface pivoted thereto, the combination of pressure sealing means fixedly attached to the said main part and in sliding engagement with the leading edge of said control surface, a pressure chamber contained within the said airfoil, a movable piston subdividing the said chamber, fluid passageways connecting the subdivided portions of said chamber respectively to the atmospheric space adjacent the leading edge of the said control surface at opposite sides of the said pressure sealing means, second pressure sealing means associated with the forward and side portions of said piston adapted to prevent pressure leakage past the piston, and a force transmitting connection operatively linking said piston to a pivotal connection on the said control surface spatially disposed above said surface pivot.

5. An aerodynamic balance for an airfoil comprising a fixed main airfoil and a relatively movable control surface pivotally attached to the trailing portion thereof, pressure sealing means fixedly attached to the said main airfoil in sliding engagement with the leading edge of the said control surface, a pair of piston vanes each pivoted at their lower terminals adjacent the lower surface of the said fixed airfoil, said piston vanes being spaced with respect to each other in a chordwise direction and mounted for rotation about spanwise extending pivot axes, a third piston vane hingedly attached in a pressure sealing relationship to the free upper terminals of each of said first two piston vanes whereby a quadrilateral expansible chamber is formed by said piston vanes and the adjacent surface of said fixed airfoil, fluid passage means to permit entrance of fluid from one side of said first pressure sealing means into said expansible chamber, a fixed fluid chamber formed within said fixed airfoil enclosing said expansible chamber, fluid passageways permitting communication with the said fixed fluid chamber to the atmosphere on the opposite side of said pressure sealing means and force transmitting means pivotally connected to said piston vane assembly and to a pivotal connection with said movable control surface.

6. In an airfoil comprising a main part and a relatively movable control surface attached thereto, the combination of pressure sealing means disposed between the leading edge of said control surface and the said main part, a pressure chamber contained within the said airfoil, a movable piston subdividing the said chamber, the said movable piston being pivotally mounted within the said chamber by means of a piano hinge, sealing means therefor including a part-circular plate embracing said hinge and a flexible sealing strip bearing on said plate, the said plate and strip forming a substantially fluid-tight cover over said hinge in all positions of said piston, fluid passageways connecting the subdivided portions of said chamber respectively to the atmospheric space adjacent the leading edge of the said control surface at opposite sides of the said pressure sealing means, second pressure sealing means associated with said piston adapted to prevent pressure leakage past the same and a force transmitting connection operatively linking said piston to the said control surface.

7. In an aerodynamic balance arrangement for aircraft, a pressure seal between two fluid spaces, said fluid spaces being separated by a hinged piston vane, a part-circular plate embracing said hinge and a flexible sealing strip bearing on said plate adapted to maintain a substantially fluid tight seal for said hinge in all positions of said piston vane.

8. In an aerodynamic balance for aircraft having a fixed main airfoil and a control surface pivotally attached thereto, a fluid chamber of fixed dimensions formed within said main airfoil, a collapsible chamber pivotally supported at two hinged axes supported by said fixed airfoil and disposed within said fixed fluid chamber, fluid partitioning means providing a continual seal at the nose of said control surface whereby adjacent fluid pressures are communicated to said fixed fluid chamber externally of said expansible chamber and fluid pressures on the other side of said partitioning members communicate with said expansible chamber for movement thereof and means to transmit said movement to said control surface.

ROBERT P. DAVIE, Jr.